(12) United States Patent
Fischbacher

(10) Patent No.: US 12,223,442 B2
(45) Date of Patent: *Feb. 11, 2025

(54) CONTEXTUAL SITUATION ANALYSIS

(71) Applicant: Google LLC, Mountain View, CA (US)

(72) Inventor: Thomas Fischbacher, Gattikon (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,338

(22) Filed: Nov. 28, 2022

(65) Prior Publication Data

US 2023/0090175 A1  Mar. 23, 2023

Related U.S. Application Data

(63) Continuation of application No. 16/607,021, filed as application No. PCT/US2018/025744 on Apr. 2, 2018, now Pat. No. 11,514,346.

(60) Provisional application No. 62/489,333, filed on Apr. 24, 2017.

(51) Int. Cl.
| | | |
|---|---|---|
| *G06N 5/045* | (2023.01) | |
| *G06F 8/10* | (2018.01) | |
| *G06F 8/41* | (2018.01) | |
| *G06F 16/901* | (2019.01) | |

(52) U.S. Cl.
CPC ............... *G06N 5/045* (2013.01); *G06F 8/10* (2013.01); *G06F 8/41* (2013.01); *G06F 16/9027* (2019.01)

(58) Field of Classification Search
CPC ........... G06F 16/9027; G06F 8/10; G06F 8/41
USPC ........................................................ 706/46
See application file for complete search history.

(56) References Cited

U.S. PATENT DOCUMENTS

| | | | |
|---|---|---|---|
| 5,602,982 A | 2/1997 | Judd | |
| 5,875,285 A * | 2/1999 | Chang | G06N 5/025 |
| | | | 706/53 |
| 6,009,420 A * | 12/1999 | Fagg, III | G09B 7/04 |
| | | | 706/45 |
| 6,952,688 B1 | 10/2005 | Goldman | |
| 7,236,963 B1 * | 6/2007 | LaMuth | G06N 5/04 |
| | | | 706/45 |
| 7,657,497 B2 | 2/2010 | Nandy | |
| (Continued) | | | |

FOREIGN PATENT DOCUMENTS

CN       103036921 A     4/2013

OTHER PUBLICATIONS

Do et al, "Sentiment Analysis of Real-Life Situations Using Location, People and Time as Contextual Features", IEEE, pp. 39-42 ( Year: 2015).*

(Continued)

*Primary Examiner* — Anil Khatri
(74) *Attorney, Agent, or Firm* — Lowenstein Sandler LLP

(57) ABSTRACT

A first context update indicative of a present state associated with an application is received. A first contextual situation, among a plurality of contextual situations associated with a plurality of conditions, that corresponds to the first context update is identified. Identifying the first contextual situation includes implementing a decision tree to minimize a number of the plurality of conditions to be evaluated, identifying the first contextual situation using the decision tree, and determining one or more actions to be performed corresponding with the first contextual situation.

20 Claims, 8 Drawing Sheets

(56) References Cited

U.S. PATENT DOCUMENTS

| | | | |
|---|---|---|---|
| 7,797,267 B2* | 9/2010 | Horvitz | G06Q 30/06 706/46 |
| 7,805,461 B2 | 9/2010 | Gadamsetty | |
| 7,987,144 B1* | 7/2011 | Drissi | G06F 18/24 706/45 |
| 8,217,756 B2* | 7/2012 | Kumar | G07C 9/28 706/47 |
| 8,423,494 B2* | 4/2013 | Barrett | G06N 5/02 706/45 |
| 8,886,576 B1* | 11/2014 | Sanketi | G06N 20/00 706/47 |
| 8,898,098 B1* | 11/2014 | Luechtefeld | G06Q 10/10 705/7.19 |
| 9,053,124 B1* | 6/2015 | Dornquast | G06F 21/552 |
| 9,443,192 B1* | 9/2016 | Cosic | G06N 5/048 |
| 9,495,444 B2 | 11/2016 | Shapira | |
| 9,727,423 B2* | 8/2017 | Dornquast | H04L 67/535 |
| 9,977,807 B1* | 5/2018 | Bowman | G06F 16/9027 |
| 9,990,187 B1* | 6/2018 | Carroll | G06F 8/30 |
| 10,057,736 B2* | 8/2018 | Gruber | H04W 4/16 |
| 10,170,123 B2* | 1/2019 | Orr | G10L 17/22 |
| 10,474,934 B1* | 11/2019 | Cosic | G06V 30/194 |
| 10,650,067 B2 | 5/2020 | Desineni | |
| 10,713,289 B1 | 7/2020 | Mishra | |
| 11,238,241 B1* | 2/2022 | Mallikarjuniah | H04L 51/02 |
| 11,501,116 B1* | 11/2022 | Kakde | H01L 22/20 |
| 11,514,346 B2* | 11/2022 | Fischbacher | G06N 5/01 |
| 11,902,607 B1* | 2/2024 | Roy | H04L 65/1069 |
| 11,989,636 B1* | 5/2024 | Leeds | G06N 3/004 |
| 2009/0182689 A1 | 7/2009 | Chiles | |
| 2009/0210470 A1 | 8/2009 | Sarlos et al. | |
| 2009/0210479 A1 | 8/2009 | Ahmed | |
| 2014/0279814 A1* | 9/2014 | Park | G06N 5/04 706/52 |
| 2015/0235126 A1 | 8/2015 | De Borst | |
| 2016/0018959 A1 | 1/2016 | Yamashita | |
| 2016/0360382 A1* | 12/2016 | Gross | G06F 3/04883 |

OTHER PUBLICATIONS

Harris, Mitigating Cognitive Biases in Machine Learning Algorithms for Decision Making, ACM, pp. 775-781 (Year: 2019).*

Zhang et al, "An Improved Object Tracking Algorithm Combining Spatio-Temporal Context and Selection Update", IEEE, pp. 1-6 (Year: 2020).*

Crane et al, "Context Aware Electronic Updates for Virtual Learning Environments", IEEE, pp. 173-175 (Year: 2012).*

Crane et al, "A Study of User Interaction with Context Aware Electronic Updates from a Moodle Learning Environment", IEEE, pp. 50-52 (Year: 2013).*

Dolan et al, "Compiler Support for Lightweight Context Switching", ACM, pp. 1-25 (Year: 2013).*

Erdwed at al."A Con-contextual Formulation of Type Rules and its Application to Incremental Type Checking" AMC pp. 880-897 (Year 2015).

Wang et al. "Ontology Bases Context Modeling and Reasoning using Owl" IEEE, pp. 1-5 (Year 2004).

Basak et al., "Interpretable Hierarchical Clustering by Constructing an Unsupervised Decision Tree," IEEE, pp. 121-132 (Year 2005).

Maranget "Compiling Pattern Matching to Good Decision Tree," ACM, pp. 35-46 (year 2008).

Leather et al, "Automatic Feature Generation for Machine Learning-Based Optimizing Compilation" ACM pp. 1-32 (Year 2014).

Ogilvie et al., "Minimizing the Cost of Interactive Compilation with Active Learning" IEEE, pp. 245-256 (Year 2017).

International Search Report and Written Opinion on application # PCT/US2018/025744, mailed on Jul. 25, 2018.

International Preliminary Report on Patenability on application # PCT/US2018/025744, mailed on Nov. 7, 2019.

Li R-H., et al., "Instability of Decision Tree Classification Algorithms," SIGKDD' 02, ACM, 2002, pp. 570-575.

Written Opinion of the International Preliminary Examining Authority for International Application No. PCT/US2018/025744, mailed Mar. 21, 2019, 11 Pages.

* cited by examiner

| | A | B | |
|---|---|---|---|
| 200 | Contextual Situations 250 | Rules 251 | Playlists 252 |
| 260A | In a Peaceful Forest at Night | isNight > 0,<br>isSkyVisible > 0,<br>biome =~ "Forest",<br>difficulty == "PEACEFUL" | Playlist 252A |
| 260B | Sandy Desert at Night | isNight > 0,<br>isSkyVisible > 0,<br>biome =~ "Desert" | Playlist 252B |
| 260C | Intensive Underground Mining | isSkyVisible == 0,<br>yPos < 50,<br>recently_break_stone > 10 | Playlist 252C |
| 260D | Near-Surface Underground Exploration | isSkyVisible == 0,<br>recently_place_LightBlocks >= 1,<br>y >= 50,<br>y <= 70,<br>biome !~ "Hell\|End",<br>maxDy >= 1,<br>blockColumn =~ "(dirt\|sand\|stone\\b)[^/]*/.+/$" | Playlist 252D |
| 260E | Near-Surface Underground Exploration | isSkyVisible == 0,<br>recently_break_BasicBlocks >= 1,<br>y >= 50,<br>y <= 70,<br>biome !~ "Hell\|End",<br>maxDy >= 1,<br>blockColumn =~ "(dirt\|sand\|stone\\b)[^/]*/.+/$" | Playlist 252E |
| 260F | Near Horses | isSkyVisible > 0,<br>soundsRidingHorse == 0,<br>numFar_Horse > 1 | Playlist 252F |
| 260G | Near a Village | isSkyVisible > 0,<br>numFar_Villager >= 3 | Playlist 252G |
| 260H | Zombie Siege | numFar_Villager >= 3,<br>numFar_Zombie >= 2,<br>Recently_zombieSummonings >= 2 | Playlist 252H |
| 260I | Early Morning Outside | isSkyVisible > 0,<br>hour >= 5,<br>hour <= 9,<br>percipitation == "" | Playlist 252I |
| 260J | Hunting | difficulty != "PEACEFUL",<br>recently_attack_Any >= 3 | Playlist 252J |

Conditions 257, Constant 254, Comparison Operator 256, Feature 253

FIG. 2

CONTEXTUAL SITUATION ANALYSIS

RELATED APPLICATION

This application is a continuation application of U.S. patent application Ser. No. 16/607,021, filed Oct. 21, 2019, which is a continuation of International Application No. PCT/US2018/025744, filed Apr. 2, 2018, which claims the benefit of Provisional Application No. 62/489,333, filed Apr. 24, 2017, the entire contents of all are hereby incorporated by reference herein.

TECHNICAL FIELD

This disclosure relates to the field of contextual situation analysis.

BACKGROUND

There are situations in which a processor is required to make decisions based on one or more received inputs. In an autonomous (or "driverless" vehicle), for example, a processor receives inputs (eg from cameras and/or radar) relating to the position and movement of other vehicles or people, and is required to make decisions such as whether to cause the vehicle to slow down, make an emergency stop, change direction etc. However, the most appropriate decision for the processor to make when it receives a particular input (such as a particular observed behaviour of another road user) is likely to depend not only on that input but on the circumstances (or context) of the situation in which the input occurs. For example, if a pedestrian steps into the road it may be appropriate for the processor to instruct the vehicle to slow down or stop and/or change direction. However, if the vehicle is already slowing to a stop at a red traffic light, and the pedestrian has stepped into the road beyond the red traffic light, the processor does not need to take any further action. That is, the processor is required to evaluate both the input and the context in which the input occurs in order to decide how, or whether, the vehicle should react. Although described here with specific reference to an autonomous vehicle, contextual situation analysis is not limited to the field of autonomous vehicles but occurs in other fields.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate a scope of the particular implementations of the disclosure or a scope of the claims. Its sole purpose is to present some concepts of the disclosure in a simplified form as a prelude to the more detailed description that is presented later.

In one implementation, a method includes receiving, by a compiler, source code including multiple rules. Each of the multiple of rules includes one or more of multiple conditions and is associated with one of multiple contextual situations. The method also generates, using the source code, a decision tree for the multiple rules. Generating the decision tree includes minimizing a number of the multiple conditions to be evaluated to determine whether a particular rule of the multiple rules has been satisfied. The method also generates a callable function that implements the decision tree. The callable function helps identify at least one of the multiple contextual situations that corresponds to a state of an application interacted with by a user.

In another implementation, the method for generating the decision tree for the multiple rules includes determining a condition from the multiple conditions as a root node of the decision tree. The determined condition optimizes a number of the multiple conditions that are eliminated from subsequent evaluations.

In implementations, the method for generating the decision tree for the multiple rules includes organizing the decision tree with multiple nodes that are associated with multiple conditions. The multiple nodes are organized so that a condition of the multiple conditions having an outcome that is implied by an outcome of an evaluation of a previous node is not subsequently evaluated.

In implementations, the source code is a domain-specific language that allows a satisfaction of a subset of conditions of the multiple conditions to be implied from a satisfaction of other conditions of the multiple conditions. In implementations, in the source code, conditions for a particular rule of the multiple rules are related by a logical conjunction, and the each of the conditions includes a feature compared to a constant using a comparison operator.

In some implementations, the method of determining the condition from the multiple conditions as the root node of the decision tree includes for each condition of the plurality of conditions evaluating a condition of the multiple conditions as true to determine a first number of conditions where an outcome is implied in view of an evaluation of the condition as true. The method also includes evaluating the condition of the multiple conditions as false to determine a second number of conditions where the outcome is implied in view of an evaluation of the condition as false. The method also includes determining a condition from the multiple conditions to be the root node based on the first number and the second number.

In implementations, a method receives a first context update for an application. The method determines whether one or more of multiple rules has been satisfied in view of the first context update. The multiple rules include a multiple conditions and are associated with multiple contextual situations. The determining includes minimizing a number of the multiple conditions to be evaluated to determine whether a particular rule of the multiple rules has been satisfied. The method responsive to determining a first rule of the multiple rules has been satisfied, identifies a first contextual situation of the multiple contextual situations that is associated with the first rule. The method also determines at least one action that is associated with the first contextual situation. In implementations, the method further causes performance of a first action of the at least one actions determined for the application. In an example relating to an autonomous vehicle, determining an action may for example comprise a processor of the autonomous vehicle determining that the vehicle needs to change direction and/or brake—causing performance of a first action of the at least one determined actions may comprise the processor instructing the braking system of the vehicle to apply the brakes and/or instructing the steering system of the vehicle to change the vehicle's direction of travel. In another one simple example, the at least one action may be a playlist of media items that is associated with the first contextual situation, and the first action may be playback of a first media item of the playlist of media items to accompany the first contextual situation identified for the application.

In implementations, the method includes receiving a second context update for the application. The method also includes determining whether one or more of the multiple rules has been satisfied in view of the second context update. The method responsive to determining a second rule of the multiple rules has been satisfied in view of the second context update, identifies a second contextual situation of the multiple contextual situations that is associated with the second rule. The method includes determining at least one other action for the second contextual situation associated with the second rule.

In implementations, the method of determining whether one or more of the multiple rules has been satisfied in view of the first context update includes applying a data set associated with the first context update to a callable function that implements a decision tree. The parameters of multiple features identified by the data set are compared to conditions of the multiple conditions that are associated with multiple nodes of the decision tree.

In implementations, the method of determining whether one or more of the multiple rules has been satisfied in view of the first context update includes keeping a record of conditions of the multiple conditions that have outcomes that are explicitly and implicitly determined from evaluated nodes of the multiple nodes of the decision tree.

In implementations, the method of determining whether one or more of the multiple rules has been satisfied in view of the first context update includes determining an initial condition of the multiple conditions to evaluate by determining a root node of the multiple nodes of the decision tree. The root node indicates a feature and a condition associated with the feature. The method also includes evaluating the initial condition identified by the root node in view of the data set of the first context update.

In implementations, the method of determining whether one or more of the multiple rules has been satisfied in view of the first context update includes responsive to the evaluation of the initial condition, evaluating a subsequent node of the decision tree where a number of the multiple conditions that have outcomes that are implied by the evaluation of the initial condition are eliminated from subsequent evaluation.

In implementations, each of the multiple rules includes one or more conditions of the multiple conditions. The one or more conditions for a particular rule of the multiple rules are related by a logical conjunction, and each of the one or more conditions include a feature compared to a constant using a comparison operator.

In implementations, the method may be performed by one or more processing devices that control a device (such as an autonomous vehicle based on the contextual situation of the device.

A further aspect of the present disclosure provides a processor-implemented method of controlling a device or process comprising: generating a callable function according to any implementation described herein; identifying, using the callable function, a contextual situation; and controlling the device or process based on the identified contextual situation. In an implementation, controlling the device or process based on the identified contextual situation may comprise determining at least one action to be performed by the device or process based at least on the identified contextual situation and optionally also based on one or more further inputs. It may further comprise the processor controlling or instructing the device or process to implement a first action of the at least one determined actions. In additional implementations, one or more processing devices for performing the operations of the above described implementations are disclosed. Additionally, in implementations of the disclosure, a computer-readable storage medium (which may be a non-transitory computer-readable storage medium, although these implementations are not limited to this) stores instructions for performing a method according to any of the described implementations. Also in other implementations, systems for performing a method according to any one of the described implementations are also disclosed. The system may comprise a memory; and a processing device, coupled to the memory, that is configured to perform a method according to any one of the described implementations. The memory may store computer-readable instructions that, when executed by the processing device, cause the processing device to perform a method according to any one of the described implementations.

DESCRIPTION OF DRAWINGS

Various implementations of the present disclosure will be understood more fully from the detailed description given below and from the accompanying drawings of various implementations of the disclosure.

FIG. 2 illustrates an example list of rules that can be used by a contextual music application, in accordance with an implementation of the disclosure.

DETAILED DESCRIPTION

Figure 1:
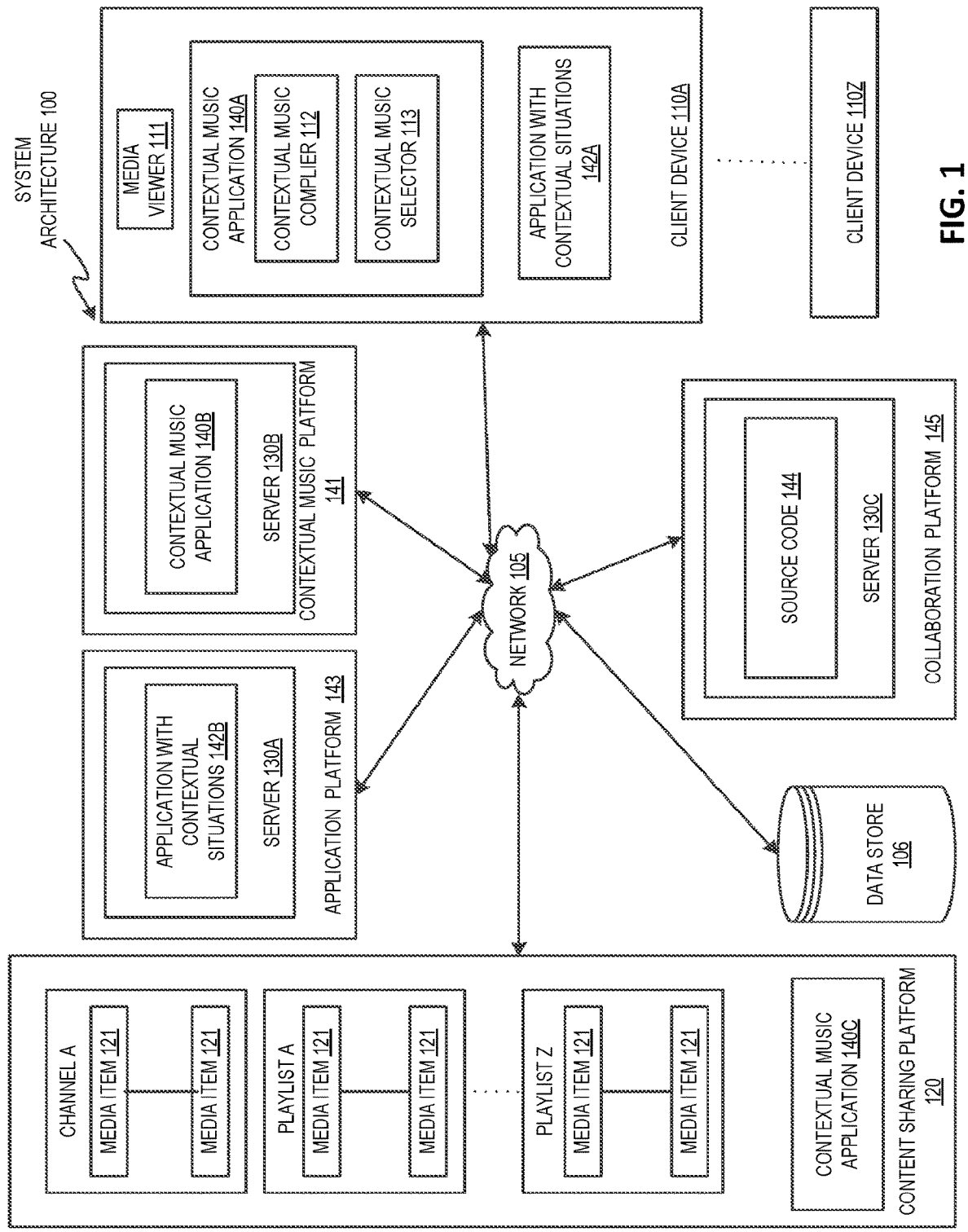
FIG. 1 illustrates an example system architecture, in accordance with one implementation of the disclosure

In an example of an autonomous vehicle interacting with a public road environment the contextual situation or environment of the vehicle frequently changes (e.g., from an "empty road" to "a congested road"). Contextual updates that include low-level information (e.g., "a person has stepped into the road") about the present contextual situation or environment may be monitored to determine if a particular high-level contextual situation (e.g., "need for emergency braking") is taking place (e.g., based on rules that map low-level information to specific high-level contextual situations). Contextual updates may occur frequently (e.g., every 0.25 seconds) and include a large set of information that is evaluated in view of a large set of rules. The aforementioned presents many challenges, such as inability to provide sufficient computational resources and power to frequently perform contextual situation analysis and identify one or more relevant actions for an identified contextual situation.

Aspects of the present disclosure address the above-mentioned and other challenges by generating a decision tree for evaluating multiple rules used to identify particular contextual situations. The decision tree minimizes a number of conditions associated with the rules that are to be evaluated to determine whether a particular rule has been satisfied, and identify a particular contextual situation that corresponds to a current state of an application or environment interacted with by the user/device determined.

In some implementations, a context update is received by an application. The method determines whether one or more of the multiple rules have been satisfied in view of the context update, where the determining minimizes a number of conditions to be evaluated to determine whether a particular rule of the multiple rules has been satisfied. The method includes identifying a contextual situation based on determining that a particular rule has been satisfied, and determining one or more actions for the contextual situation.

Accordingly, aspects of the present disclosure provides a mechanism that minimizes computations involved in evaluating conditions to determine whether a particular rule has been satisfied, determines from the satisfied rule a contextual situation that corresponds to a state of the application or environment, and selects one or more actions for the identified contextual situation. Aspects of the present disclosure result in reduction of storage and computational (processing) resources, as well as associated resources such as battery power, because reducing the number of conditions (and rules) for evaluation to determine a particular contextual situation is more efficient than evaluating all or a majority of rules to determine a particular situational context. Furthermore, reducing the number of conditions (and rules) for evaluation to determine a particular contextual situation reduces the time taken to determine an appropriate action to be taken, and this may, for example, improve the braking/stopping performance of an autonomous vehicle by reducing the time required for the processor of the vehicle to determine that the vehicle needs to stop to avoid a collision.

As noted, the present disclosure provides an improved method of selecting one or more actions for an identified contextual situation, and may be applied in many fields. As another example, a user may be interacting with an online gaming system where the contextual situation or environment of the game frequently changes (e.g., from a "peaceful desert environment at night" to "a ride in a spaceship in outer space"). Contextual updates that include low-level information (e.g., "altitude=1k meters") about the present contextual situation or environment may be monitored to determine if a particular high-level contextual situation (e.g., "a ride in a spaceship in outer space") is taking place (e.g., based on rules that map low-level information to specific high-level contextual situations). When interacting with an application, users may prefer customized and varied music that corresponds to fast changing contextual situations. As in the case of an autonomous vehicle, contextual updates may occur frequently and significant computational resources and power may be required to frequently perform contextual situation analysis and identify one or more relevant actions for an identified contextual situation, such as determining a playlist for a contextual situation. For purposes of clarity and simplicity, the term "playlist" or "media playlist" may be a list or an order or a grouping of different media items that can be viewed or displayed or played back in sequential or shuffled order with or without interaction from a user.

In the following, simple examples referring to selection of a playlist are used for illustration rather than limitation. As explained, however, it may be appreciated that features of the present disclosure may be applied to multiple types of applications.

FIG. 1 illustrates an example system architecture 100, in accordance with one implementation of the disclosure. The system architecture 100 includes client devices 110A through 110Z, a network 105, a data store 106, a content sharing platform 120, an application platform 143, a collaboration platform 145, and a contextual music platform 141.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In one implementation, data store 106 stores media items, such as video items.

The client devices 110A through 110Z may each include computing devices such as personal computers (PCs), laptops, mobile phones, smart phones, tablet computers, netbook computers, network-connected televisions, etc. In some implementations, client devices 110A through 110Z may also be referred to as "user devices." Each client device includes a media viewer 111. In one implementation, the media viewers 111 may be applications that allow users to view or upload content, such as images, video items, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A through 110Z by the contextual music platform 141 and/or content sharing platform 120. For example, the media viewers 111 may be embedded media players that are embedded in web pages provided by the content sharing platform 120. In another example, the media viewers 111 may be applications that are downloaded from the contextual music platform 141.

In general, functions described in one implementation as being performed by the content sharing platform 120 can also be performed on the client devices 110A through 110Z in other implementations, if appropriate. In other implementations, functions described as being performed by a particular component may be performed by an alternative component. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), disapprove of ("dislike"), and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

A media item 121 may be consumed via the Internet and/or via a mobile device application. For brevity and simplicity, a video item is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. In another implementation, the content sharing platform 120 may store video items and/or fingerprints as electronic files in one or more formats using data store 106.

In one implementation, the media items are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or a set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example. In some implementations, the video items may be consumed primarily for the audio component rather than the video component. In one implementation, the media items are audio-only items, such as music items.

In implementations, content sharing platform 120 may allow users to create, share, view or use playlists containing media items (e.g., playlist A-Z, containing media items 121). A playlist refers to a collection of one or more media items that are configured to play one after another in a particular order without user interaction. In implementations, content sharing platform 120 may maintain the playlist on behalf of a user. In implementations, the playlist feature of the content sharing platform 120 allows users to group their favorite media items together in a single location for playback. In implementations, content sharing platform 120 may send a media item on a playlist to client device 110 for playback or display. For example, the media viewer 111 may be used to play the media items on a playlist in the order in which the media items are listed on the playlist. In another example, a user may transition between media items on a playlist. In still another example, a user may wait for the next media item on the playlist to play or may select a particular media item in the playlist for playback. In another example, contextual music application 140 may select media items from a playlist for playback on client device 110.

In implementations, a playlist may be associated with a particular user or users, or made widely available to users of the content sharing platform 120. In implementations, where content sharing platform 120 associates one or more playlists with a specific user or group of users, content sharing platform 120 may associated the specific user with a playlist using user account information (e.g., a user account identifier such as username and password). In other implementations, content sharing platform 120 may associate a playlist with additional information (also referred to as "metadata" or "playlist metadata" herein). For example, a playlist may be associated with a title (e.g., Jakob's playlist), information related to the playlist (e.g., when the playlist was created, user account information), additional information regarding the media items of the playlist (e.g., artist information, genre, tempo, a hyperlink (link) to the media item, etc.), or information regarding the electronic messages used to populate the playlist with the media items (e.g., part or all the electronic messages, sentiment identifiers associated with the electronic messages, topics associated with the electronic messages, sender or receiver information related to the electronic messages (such as name of sender), etc.). In some implementations, a playlist may be created by content sharing platform 120, contextual music platform 141, application 142, or a user of the aforementioned.

In some implementations, content sharing platform 120 may make recommendations of media items to a user or group of users. A recommendation may be an indicator (e.g., interface component, electronic message, recommendation feed, etc.) that provides a user with personalized suggestions of media items that may appeal to a user. In implementations, a recommendation may be made using data from a variety of sources including a user's favorite media items, recently added playlist media items, recently watched media items, media item ratings, information from a cookie, user history, and other sources.

In implementations, content sharing platform 120, application platform 143, contextual music platform 141, or collaboration platform 145 may be implemented on one or more servers 130. In implementations, the server 130 (e.g., 130A-C) may be one or more computing devices (e.g., a rackmount server, a server computer, etc.). The server 130 may be included in the content sharing platform 120, be an independent system or be part of another system/platform, such as application platform 143, contextual music platform 141, or collaboration platform 145.

In implementations, collaboration platform 145 may be executed on server 130C and store source code 144. In some implementations, a user or administrator may access collaboration platform 145 to upload or otherwise modify source code 144. In some implementations, collaboration platform 145 may be a document sharing platform where users may create, edit, and share documents. In other implementations, the source code 144 may be stored on client device 110A or provided by application platform 143 or contextual music platform 141. In other implementations, collaboration platform 145 may in part or wholly be implemented on client device 110 or other platforms.

In implementations, application platform 143 may provide an application that is accessed by a user through client devices 110A-110Z. In some examples, application platform 143 executes a gaming environment, such as a 3D-gaming environment or virtual gaming environment, for access by client devices 110A-110Z. In implementations, application platform 143 may be implemented on server 130A. Application platform 143 may execute application 142B (also referred to as "application with contextual situations" herein). The application 142B may be in a particular state at a given time, where the particular state corresponds to a contextual situation. In implementations, a contextual situation may refer to a state or particular context of for example, an application, a user, a physical environment, virtual environment (e.g., virtual reality), or augment environment (e.g., augmented reality). In implementations, the contextual situation may further refer to the state or particular context of the application that is interacted with by the user at a particular point in time. For example, application 142 may be a gaming application and a contextual situation may be a high-level description of the gaming environment at a particular time. For instance, the contextual situation "in a peaceful forest at night" may reflect the current gaming environment of an application 142B, where the gaming environment is concurrently displayed on client device 110. In implementations, a user may interact with the application 142B using client device 110. In still other implementations, application 142B may be in part or wholly implemented on client device 110 (or on other platforms), as illustrated by application 142A on client device 110A.

In implementations, contextual music platform 141 may be implemented on server 130B. In implementations, contextual music platform 141 may execute contextual music application 140B. In implementations, contextual music application 140B may in part or wholly be implemented on client device 110 (or on other platforms), as illustrated by contextual music application 140A on client device 110A. Contextual music application 140 may include contextual music compiler 112 or contextual music selector 113. In other implementations, contextual music compiler 112 and contextual music selector 113 may be separate applications implemented on the same or different devices.

Although implementations of the disclosure are discussed in terms of content sharing platforms and promoting social network sharing of a content item on the content sharing platform, implementations may also be generally applied to multiple types of social networks that provide connections between users or multiple types of systems where contextual situation analysis may be applied. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

FIG. 2 illustrates an example list of rules that can be used by the contextual music application, in accordance with an implementation of the disclosure. Source code 200 may be similar to source code 144 as described with respect to FIG. 1. It may be noted that components of FIG. 1 may be used herein to help describe FIG. 2.

The list 200 can be stored in a tabular format including columns, such as columns labeled contextual situations 250, rules 251, and playlists 252, and rows such as rows 260A-J. In some implementations, the list 200 includes source code that defines rules using a programming language (e.g., object-oriented language, scripting language, markup language, etc.), It may be noted that the list 200 is provided for purposes of illustration, rather than limitation, and may have one or more columns, rows, or types of information.

As noted above, contextual situations 250 may refer to a state or particular context of, for example, an application, a user, a physical environment, virtual environment (e.g., virtual reality), or augment environment (e.g., augmented reality). For example, contextual situations 250 may describe particular states of a gaming environment, such as "Sandy Desert at Night," (e.g., row 260B), "Zombie Siege," (e.g., row 260H), or "Hunting" (e.g., row 260J). In implementations, each of the contextual situations 250 is associated with a rule 251 and a playlist 252. For example, contextual situation 250 of row 260A, "In a Peaceful Forest at Night," is associated with rule 251 of row 260A (e.g., "isNight>0 . . . difficulty='PEACEFUL'") and playlists 252A.

In implementations, a particular rule, such as rule 251 of row 260A, may have one or more associated conditions, such as conditions 257. In some implementations, the satisfaction of conditions, such as conditions 257 of the associated rule 251 of row 260A, indicates the existence of the associated contextual situation 250 (e.g., "In a Peaceful Forest at Night"). In some implementations, conditions, such as conditions 257, are related by logical conjunctions, such as a logical "AND." For example, all the conditions 257 are to be satisfied at the same time before the existence of the contextual situation 250, "In a Peaceful Forest at Night," is determined.

In implementations, each contextual situation 250 of rows 260A-J is associated with a corresponding playlist 252A-J. In implementations, the playlists 252 may include one or more media items, such as video items or audio items. Each of the playlists 252 may include an indicator to locate the playlist or associated media items. For example, playlist 252A may contain a universal resource locator (URL) that points to the playlist stored on content sharing platform 120. In another example, playlist 252A may point to a folder or file stored locally on the user device. In still other implementations, one or more playlists 252 may include additional information such as start or end timestamps that identify portions of a media item on a playlist for playback. For example, the start or end timestamps may indicate playback of a particular media item should begin at minute 1:00 and end at minute 1:45.

In some implementations, each condition 257 includes a feature 253 compared to a constant 254 by a comparison operator 256. In implementations, a feature 253 may describe an element of a contextual situation 250. For example, "altitude," "isNight," "isSkyVisible," "biome," and "difficulty" may be features of one or more contextual situations 250 of a gaming application.

In some implementations, a constant 254 may include a string or number, such as an integer. In implementations, the comparison operators 256 for constants 254 that are numbers may include equality or inequality (e.g., equal to, not equal to, less than, greater than, less than or equal to, greater than or equal to). In implementations, the comparison operators 256 for constants 254 that are strings may include equality, inequality, match, or does not match a regular expression.

In some implementations, source code 200 may be a domain-specific language that allows for a satisfaction of some conditions 257 to be implied from a satisfaction of other conditions. For example, if the condition "altitude>10,000 meters" is true, then it may be logically implied that the condition "altitude>1,000 meters" is also true. In another example, if the condition "biome=='ocean'" is true, then it may be logically reasoned that "biome=='forest'" is not true. In some implementations, the domain-specific language may implement a constrained set of comparison operators 256 and include conditions 257 that are related by logical conjunctions, as described above.

In some implementations, the list 200 may be available to the user for creation and modification. For example, a user may create a file including the list 200 using collaboration platform 145. The user may define particular contextual situations 250, define the rules 251, or associate particular playlists 252 with the contextual situations 250. In other implementations, the user may select the media items contained in a particular playlist 152. In other implementations, the list 200 may be created or managed by an administrator or developer.

Figure 3:
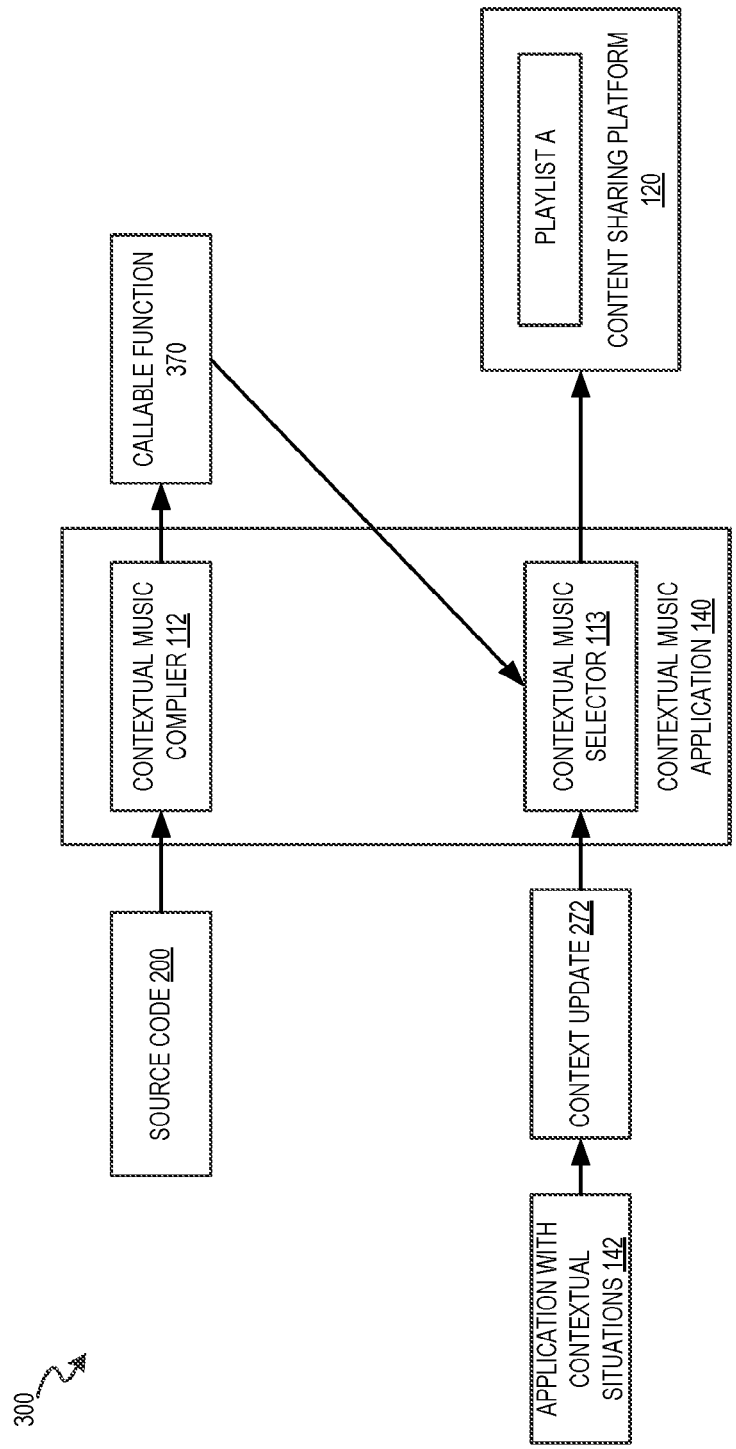
FIG. 3 is an example system that uses contextual music application, in accordance with implementations of the disclosure.

FIG. 3 is an example system utilizing the contextual music application, in accordance with implementations of the disclosure. In implementations, system 300 may be implemented using system architecture 100 described with respect to FIG. 1. Features of FIG. 3 may include components described in FIGS. 1-2, as well as additional components.

In implementations, the list 200, as described with respect to FIG. 2, includes source code that defines rules using a programming language. The source code 200 may be sent to contextual music compiler 112 of contextual music application 140, where contextual music compiler 112 may translate source code 200 into executable code. As described with respect to FIG. 2, source code 200 may include multiple rules, where each of the rules includes one or more conditions. In implementations, each of the multiple rules may be associated with a contextual situation.

In one implementation, the contextual music compiler 112 uses source code to generate a decision tree. In implementations, the decision tree includes a root node that is connected to other nodes (also referred to as "subsequent nodes" herein) by branches. In one implementation, each of the nodes of the decision tree may be defined by a particular condition, for example "biome='forest'", or a particular feature, such as "biome." In implementations, the decision tree may be used to minimize the number of conditions to be evaluated to determine whether a particular rule of the multitude of rules has been satisfied. It may be noted that minimizing the number of conditions to be evaluated to determine whether a particular rule has been satisfied may be performed in other manners.

In implementations, a single root node may be used and subsequent nodes are evaluated dependent on the outcome of the root node or one or more previous nodes. Evaluation may refer to a determination process to determine the outcome of a particular condition. For example, the outcome of an evaluation of a condition of a node of a decision tree may be "true" or "false." Responsive to the outcome of an evaluation of a node, other conditions associated with other nodes, may be known or moot and not need to be further evaluated. In implementations, the outcome of an evaluation of a condition of a node may imply that other conditions are satisfied, imply that other conditions are not satisfied, or imply that some rules cannot be satisfied (and the conditions associated with the rules are moot and need not be evaluated), for example. In implementations, the decision tree may be constructed so that some or all implied conditions are not evaluated at subsequent nodes. Additional information regarding decision tree is described with respect to FIG. 4.

In implementations, contextual music compiler 112 generates a callable function 370 that implements the decision tree. Callable function 370 may be used to identify at least one of the multiple contextual situations, as defined in the source code 200, which corresponds to a state of the application 142 that is interacted with by the user. In implementations, the callable function 370 may be sent to contextual music selector 113 of contextual music application 140.

In an implementation, callable function 370 applies a context update 272 as input. In an implementation, a context update 272 may include a data set that provides parameters for various features of a contextual situation being executed by application 142. For example, context update 272 may include "altitude=10,000 meters, biome='desert; . . . " In implementations, the parameters for features identified in the data set are compared to conditions that are associated with nodes of the decision tree. In implementations, callable function 370, responsive to applying the context update 272, determines whether one or more of the multiple rules have been satisfied. In implementations, the callable function 370 implements the decision tree to make the determination that a rule has been satisfied to minimize a number of the multiple conditions to be evaluated to determine whether a particular rule of the multiple rules has been satisfied.

In one implementation, callable function 370 in conjunction with contextual music application 140 may identify a particular rule that has been satisfied responsive to applying the context update 272 to the callable function 370. The callable function 370 of contextual music application 140 may identify a contextual situation that is associated with the satisfied rule, responsive to determining the particular rule has been satisfied. For example, the callable function may output one or more identifiers that indicate one or more corresponding contextual situations.

In implementations, responsive to determining the particular rule has been satisfied and determining the contextual situation associated with the rule, contextual music selector 113 may determine the particular playlist that is associated with the satisfied rule. It may be noted that in implementations, responsive to a single context update 272, one or more rules (or none) may be satisfied and one or more corresponding contextual situations may be identified. Responsive to identifying multiple satisfied contextual situations, multiple playlists may be identified, and media items from a particular playlist of the multiple playlists may be selected for playback. Responsive to determining the particular playlist, contextual music selector 113 may retrieve or cause playback of media items from the particular playlist. In some implementations, contextual music selector 113 may query content sharing platform 120 using an application program interface (API) for access or playback of the particular playlist A. In implementations, contextual music selector 113 may cause a concurrent playback of a media item of the playlist A with the occurrence of the contextual situation identified for the application 142. For example, a video item (e.g., music video) may be caused to play in a browser or application on the user device while the user is engaged in a particular contextual situation executing on a gaming application.

In implementations, a media item may be randomly chosen from the playlist A. In other implementations, various algorithms may be used to choose a media item from the playlist by determining which media item the user would have the most affinity towards in view of the particular contextual situation. It may be noted that in other implementations, playlists associated with particular contextual situations may be retrieved by different or multiple platforms, or may be retrieved local to the user device.

In some implementations, a context update may be mapped to one or more contextual situations and multiple media items, such as audio-only items, that are contained in the one or more playlist. In implementations, determining a media item from the one or playlists for playback may include one or more factors, such as matching scores, variety settings, playback history, or user feedback.

In implementations, each of the media items of the identified playlist(s) may be assigned a matching score. A matching score may be indicative of a media item's determined matching or affinity with an identified contextual situation(s). For example, a media item with a matching score of 90 has a higher affinity with a particular contextual situation than another media item with a matching score of 60 for the same contextual situation. In implementations, responsive to receiving a context update 272, if a new media item has a matching score that is higher than the current media item that is presently being played, the new media item will interrupt playback of the current media item (e.g., fade out) and replace (e.g., fade in) the current media item. In other implementations, if playback of a current media item has ended (e.g., reached the end of the song or user has interrupted playback), the next media item may be determined from the most recent context update in a manner described herein. In some implementations where the playback of the current media item has ended and a context update is stale (received before a threshold amount of time), contextual music selector 113 may not begin playback of a new media item. In implementations, after playback of a particular media item begins, the other media items of the one or more playlists are blocked from interrupting playback.

In some implementations, a variety setting may be controlled by a user, developer, or administrator. In implementations, a variety setting may refer to an indication, such as a numerical setting, that indicates the relative importance of diversity (e.g., importance of playback of different media items rather than playback of media items with the highest matching score). The variety setting may provide a statistical probability (e.g., relative likelihood) of selecting media items for playback where the items have different matching scores, where media items with lower matching scores have a lower probability of being selected. For example, the variety setting may be 25% and three candidate audio-only items may have matching scores of 85, 75, and 65. A probability (e.g., ratio) may be determined for each candidate audio-only item so that each item has a non-zero probability of being selected. For instance, the probability that one of the candidate audio-only items is selected is 100%. The probability that each candidate audio-only item may be selected may be determined by choosing a first ratio that allows each subsequent ratio to be 25% of the preceding ratio and have all the ratios add to 100%. For instance, the probability for the matching score-85 audio-only item to play is 16/21, the probability for the matching score-75 audio-only item is 25% of that, e.g., 4/21, and the probability of the matching score-65 audio-only item is 1/21, e.g., 25% of that of the matching score-75 audio-only item (note that 16/21+4/21+1/21=21/21=1).

In some implementations, playback history may be taken into account to select media items from playlists for playback. For example, a rule may be implemented where the last N-number of last played songs are not repeated. In some implementations, user feedback may be used to change the probabilities of playback. For example, selection of like or dislike input elements by a user may be used to change the probability of playback (e.g., relative play probabilities as described above with respect to variety settings) of a particular media item. In still other implementations, contextual music selector 113 determines the fraction of times each candidate media item has been played as well as the fraction of times each candidate media item should be played e.g., (relative play probabilities as described above with respect to variety settings), and picks the media item that minimizes the relative entropy (Kullback-Leibler divergence) between the observed and desired times-played distributions.

In some implementations, application 142 may generate frequent context updates 272. For example, context updates 272 may occur every 0.25 seconds and contain a data set with dozens to hundreds of parameters. In some implementations, contextual music selector 113 may use an API to communicate and request context updates 272 from application 142. In some implementations, content recognition techniques may be used to generate some or all of the data set of context update 272. For example, screen shot analysis may be implemented that identifies text and elements or features displayed by application 142 on client device.

In implementations, after a media item is played back on a user device responsive to determining the contextual situation of the application 142, contextual music selector 113 may receive a new context update 272. If the contextual music selector 113 determines, in view of the new context update 272, that the contextual situation for the application has not changed, the contextual music selector 113 may continue playback of the media item or choose another media item from the associated playlist for playback. If the contextual music selector 113 determines, in view of the new context update 272, that a new rule of the multiple rules has been satisfied, contextual music selector 113 may identify another contextual situation associated with the newly identified rule. Contextual music selector 113 may retrieve another playlist from content sharing platform 120 for the new contextual situation, and cause playback of a media item from the other playlist.

In one implementation, contextual music compiler 112 of contextual music application 140 may generate a decision tree for the multiple rules by determining a condition from the multiple conditions to be the root node of the decision tree. In implementations, a single decision tree with a single root node is used. In other implementations, multiple decision trees may be used. In implementations, the root node optimizes a number of the plurality of conditions that are eliminated from subsequent evaluations. As noted above, in implementations, the outcome of an evaluation of a condition of a node may imply that other conditions are satisfied, imply that other conditions are not satisfied, or imply that some rules cannot be satisfied (and the conditions associated with the rules are moot and need not be evaluated). In implementations, implied conditions may not need to be re-evaluated.

In one implementation, in order to construct the decision tree, contextual music compiler 112 may check every condition (or feature) that best approximates a 50-50 split between conditions (or rules) that are eliminated from subsequent evaluation and conditions that are not eliminated from subsequent evaluation responsive to the outcome of the evaluation of a condition of the root node.

For example, contextual music compiler 112 may evaluate the condition "biome='forest'." Evaluating the condition "biome='forest'" as true implies the outcome of 40 percent of the conditions and eliminates 40 percent of the conditions (as described in source code 200) from subsequent evaluation. Evaluating the condition "biome='forest'" as false implies the outcome of 50 percent of the conditions and eliminates 50 percent of the conditions from subsequent evaluation. The worst case split for the condition "biome='forest'," irrespective of the outcome of the evaluation (e.g., "true" or "false"), is 40-60 (e.g., percentage conditions eliminated from a subsequent evaluation compared to percentage of conditions not eliminated from subsequent evaluation responsive to the outcome of the evaluation of "biome='forest'"). Each condition may be evaluated in a similar manner as described above to determine the condition of the root node. If the 40-60 split for the condition "biome='forest'" is determined to be closest or one of the closest to the target split, such as a 50-50 split, "biome='forest'" may be chosen as a root node.

In other implementations, the decision tree may be organized with subsequent nodes connected to each other and the root node by branches. It may be noted that a decision tree may be evaluated in serial manner such that the outcome of an evaluation of a previous node determines which subsequent node(s) to evaluate and which subsequent node(s) not to evaluate. In implementations, the nodes of the decision tree may be organized so that a condition of the multiple conditions where the outcome is implied (e.g., by the outcome of an evaluation of a previous node) is not evaluated at a connected subsequent node.

In some implementations, the nodes subsequent to the root node may be determined after the root node is determined, and in a similar manner as the root node is determined. For example, for determining subsequent nodes for each branch of the decision tree, contextual music compiler 112 may check every remaining condition (e.g., conditions not determined as previous nodes) for the one condition that best approximates a 50-50 split between conditions (or rules) that are eliminated from subsequent evaluation and conditions that are not eliminated from subsequent evaluation responsive to the outcome of the evaluation of a condition of the corresponding node.

In an implementation, the decision tree may be implemented in a callable function 370 that receives context updates 272 as inputs. The callable function 370 may determine whether one or more of the multiple rules has been satisfied in view of the context update 272. In one implementation, the callable function 370 uses the decision tree to identify the initial condition to evaluate. In implementations, the callable function 370 may determine the root node of the decision tree, and determine from the root node the associated feature and condition from which to begin the contextual situation analysis. The callable function 370 may evaluate the initial condition identified by the root node in view of the data set of the context update 272. In implementations, the outcome of the evaluation may be either "true" or "false." The outcome of the evaluation may direct the callable function 370 to follow a specific branch or specific branches and evaluate corresponding subsequent node(s). In some implementations, responsive to the evaluation of the initial condition of the root node (or other nodes of the decision tree), the callable function 370 evaluates a subsequent node of the decision tree where a number of the plurality of condition that have outcomes that are implied by the evaluation of the initial condition are eliminated from subsequent evaluation.

In some implementations, callable function 370 or contextual music selector 113 keeps a record (e.g., table or scoreboard) of the conditions that have outcomes that are explicitly and implicitly determined from the evaluated nodes of the decision tree. In implementations, the record may held keep track of whether or not a particular rule has been satisfied. Once a rule has been satisfied, the associated contextual situation is identified and the associated playlist is retrieved.

Figure 4A:
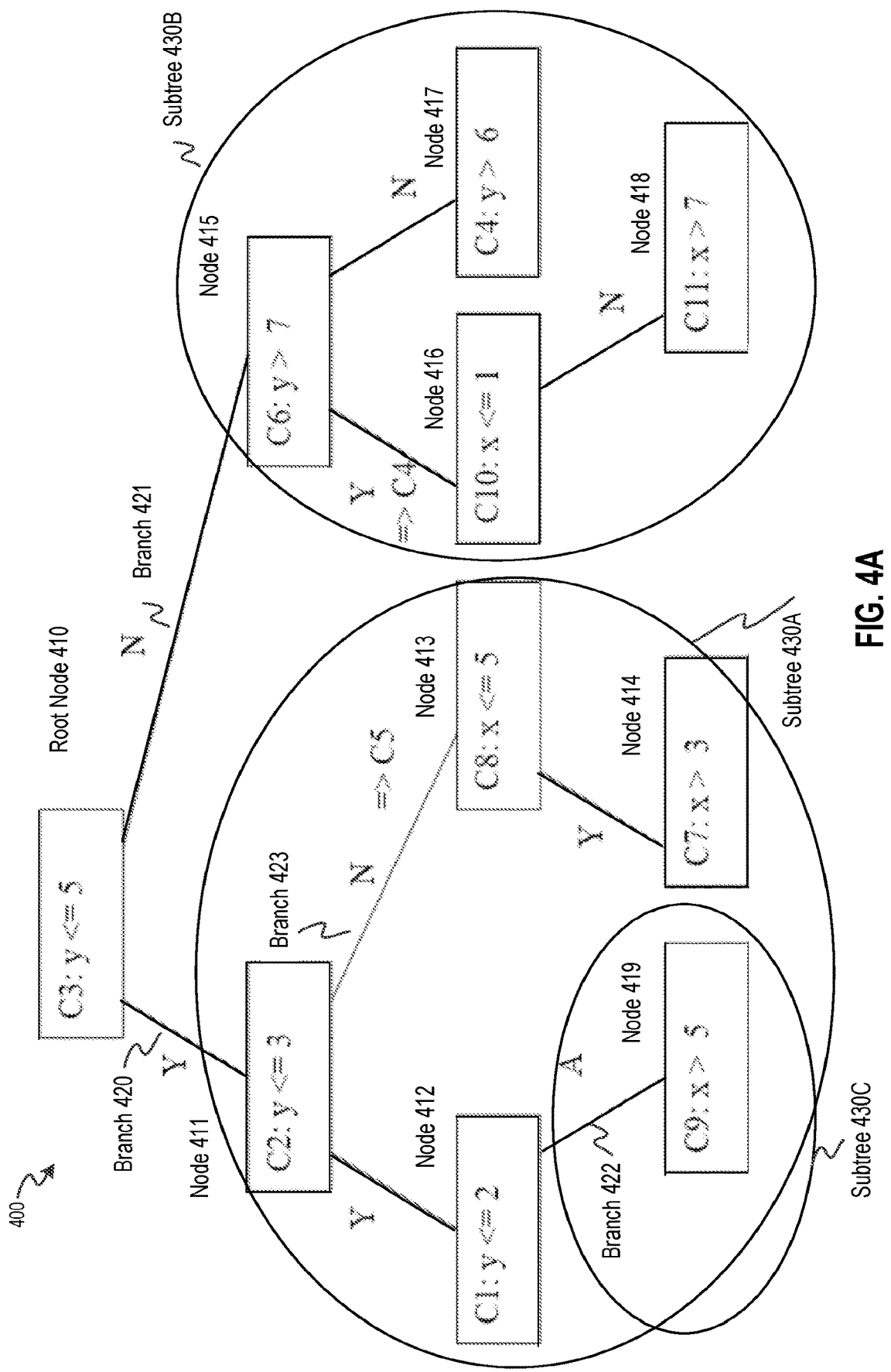
FIG. 4A illustrates generation and use of a decision tree by contextual music application, in accordance with implementations.
Figure 4B:
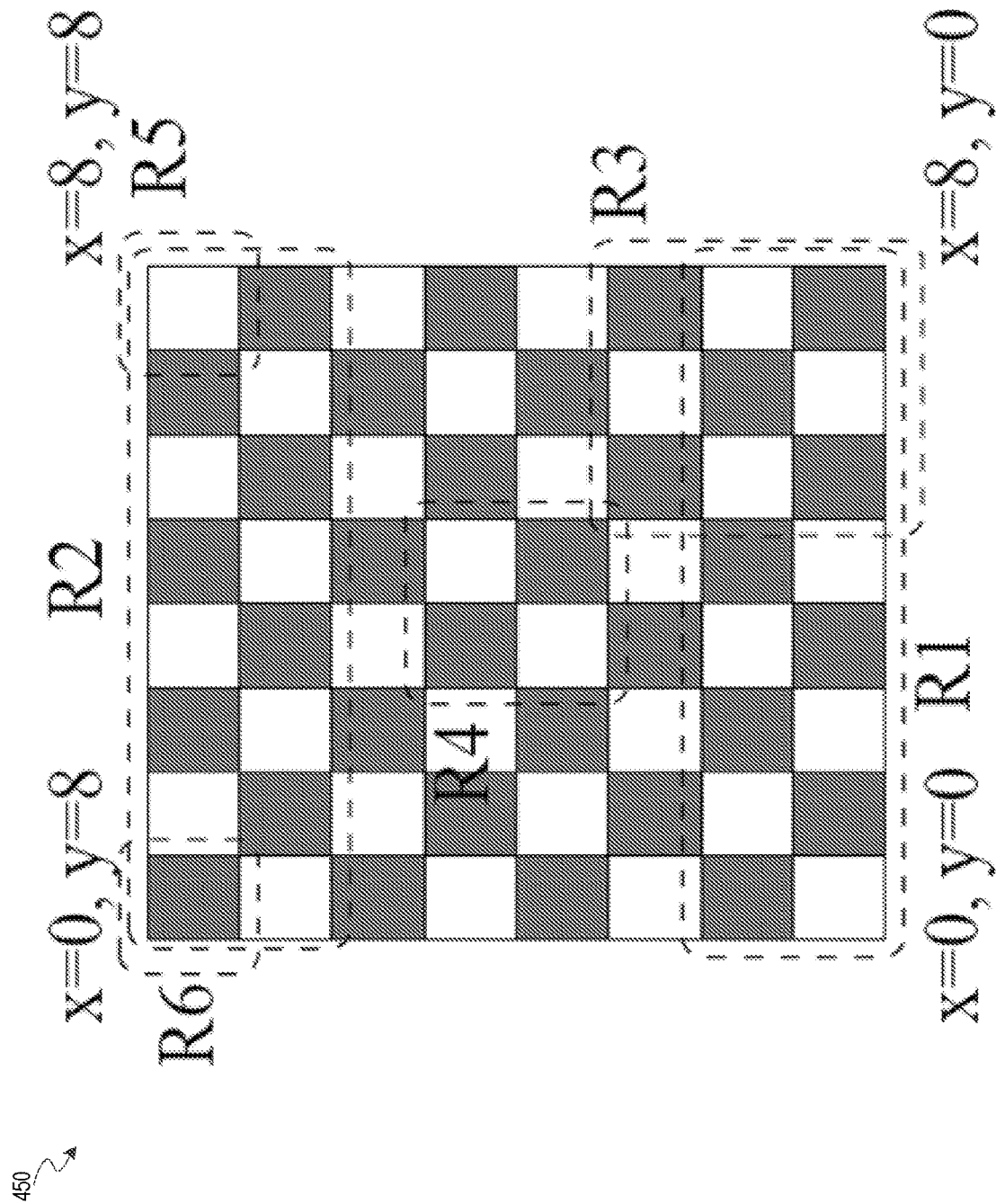
FIG. 4B illustrates a record used to keep track of whether a particular rule has been satisfied, in accordance with implementations.

FIG. 4A illustrates generation and use of a decision tree 400, in accordance with implementations. FIG. 4B illustrates a record 450 used to keep track of whether one or more rules has been satisfied, in accordance with implementations. As noted above, a decision tree 400 may be used to minimize the number of conditions to be evaluated to determine whether one or more rules of the multitude of rules has been satisfied. Components of the previous FIGS. 1-3 are used to help describe FIG. 4A-B. It may be noted that the number of elements, such as conditions, rules, and nodes, is provide for purposes of illustration, rather than limitation. In other implementations, another number of elements may be used.

In an implementation, decision tree 400 shows root node 410, and various subsequent nodes 411-419. The nodes are connected by branches, such as braches 420 and 421. For example, root node 410 is connected to node 411 by branch 420 and is connected to node 415 by branch 421. Conditions corresponding to each node are identified as C1 through C11. The conditions C1-C11 are as follows: C1: $y<=2$, C2: $y<=3$, C3: $y<=5$, C4: $y>6$, C5: $y>3$, C6: $y>7$, C7: $x>3$, C8: $x<=5$, C9: $x>5$, C10: $x<=1$, C11: $x>7$.

As noted above, a rule may include on or more conditions. For example, decision tree 400 may represent a decision tree for six rules, Rules 1-6. For example, the Rules 1 through 6 are represented as follows: Rule 1: C1, $y<=2$; Rule 2: C4, $y>6$; Rule 3: C2 AND C9, $y<=3$ AND $x>5$; Rule 4: C5 AND C3 AND C7 AND C8, $y>3$ AND $y<=5$ AND $x>3$ AND $x<=5$; Rule 5: C6 and C11, $y>7$ AND $x>7$; Rule 6: C6 AND C10, $y>7$ AND $x<=1$. Record 450 of FIG. 4B illustrates the Rules 1-6 as regions R1 through R6, respectively, of record 450. Record 450 shows a checkerboard having an X-axis (horizontal axis) and Y-axis (vertical axis), where each checker represents an X-Y value. For example, region R1 corresponds to rule 1 (e.g., Rule 1: C1, $y<=2$). If condition C1 ($y<=2$) is "true," all the checkboxes located below $y=2$, are checked and are also "true." It may be noted that at least of some of values corresponding to Rule 3 (e.g., R3) are also "true" if Rule 1 is "true," as illustrated by the overlap of regions R1 and R3.

In one implementation, given conditions C1-C11, a compiler (for example the contextual music compiler 112) generates decision tree 400 where every node 410-419 has 3 subtrees, rather than 2 subtrees. In some implementations, 1 or more subtrees may be used. It may be noted that one or more subtrees may be empty and not shown connected to a particular node.

In an implementations, the 3 subtrees may include a subtree to evaluate if the current node's check evaluates as "true" (The "(Y)es" branch) (e.g., subtree 430A), a subtree to evaluate if the current node's check evaluates as "false" (The "(N)o" branch) (e.g., subtree 430B), and a subtree to always (A) evaluate after evaluating the (Y)es or (N)o branch (e.g., subtree 430C). Subtree 430C represents an "always" subtree, and is to be evaluated if the condition of node 412 is evaluated as "true" or "false." Subtree 430C may also be referred to an independent subtree, where the evaluations of conditions of the independent subtree are independent from the evaluation of one or more nodes, such as node 412 (e.g., the outcome of the nodes of the independent subtree cannot be explicitly or implicitly determined from the evaluation of other related conditions or nodes).

In decision tree 400, root node 410 includes condition C3. In implementations, the condition (e.g., C3) of root node 410 gets checked first by contextual music selector 113. As illustrated, irrespective of whether C3 evaluates as "true" or "false," 3 out of 6 rules are eliminated (e.g., 50/50 split) from further evaluation.

In implementations, responsive to a condition being evaluated as "true" or responsive to an evaluation of a condition that implies outcomes (e.g., "true" or "false") of other conditions (e.g., a branch is entered that implies a particular condition(s)), the corresponding explicit and implied conditions get marked as "satisfied" on the record 450 for each related rule that contain the explicit and implied conditions. It may be noted that in implementations, contextual music selector 113 may perform the evaluation of conditions or rules using decision tree 400 and record 450.

In one example, if the condition C3 of root node 410 is "true," C2 of node 411 gets checked next. If C2 is "true," C1 of node 412 gets checked (which decides if Rule 1 is "true"), and irrespective of the outcome of C1 of node 412, C9 of node 419 gets checked afterwards (which decides if Rule 3 is true). In another example, in case the check C2 of node 411 is "false" (e.g., not $y<=3$), the outcome of the evaluation of node 411 implies condition C5 ($y>3$) (as illustrated). It may be noted that implied conditions may be represented by the decision tree as illustrated by branch 423. Responsive to the determining the implied condition C5 is satisfied, C5 on record 450 gets marked as "satisfied" and is not re-checked. Continuing the example, responsive to C2 being evaluated as "false," C8 is checked, and if "true," C7 is checked (which decides if rule 4 is "true").

In another example, responsive to condition C3 of root node 410 being evaluated as "false," C6 of node 415 is checked to exclude Rule 5 and Rule 6 in the case C6 does not hold. If C6 is "true," the outcome implies C4 (and hence Rule 2). If C6 is "false," then C4 is checked to decide Rule 2. Also, if C6 is "true," contextual music selector 113 checks if C10 holds (which decides Rule 6), and only if C10 is "false," then C11 needs to be checked (since C10 and C11 are mutually exclusive), which decides Rule 5.

It may be noted that by implementing decision tree 400, only 4 condition evaluations have been performed to determine for each of the 6 rules whether one or more rules are "true" or "false." It may be noted that a brute force evaluation may check all the conditions for all the rules independently and perform the evaluation of 12 conditions.

Figure 5:
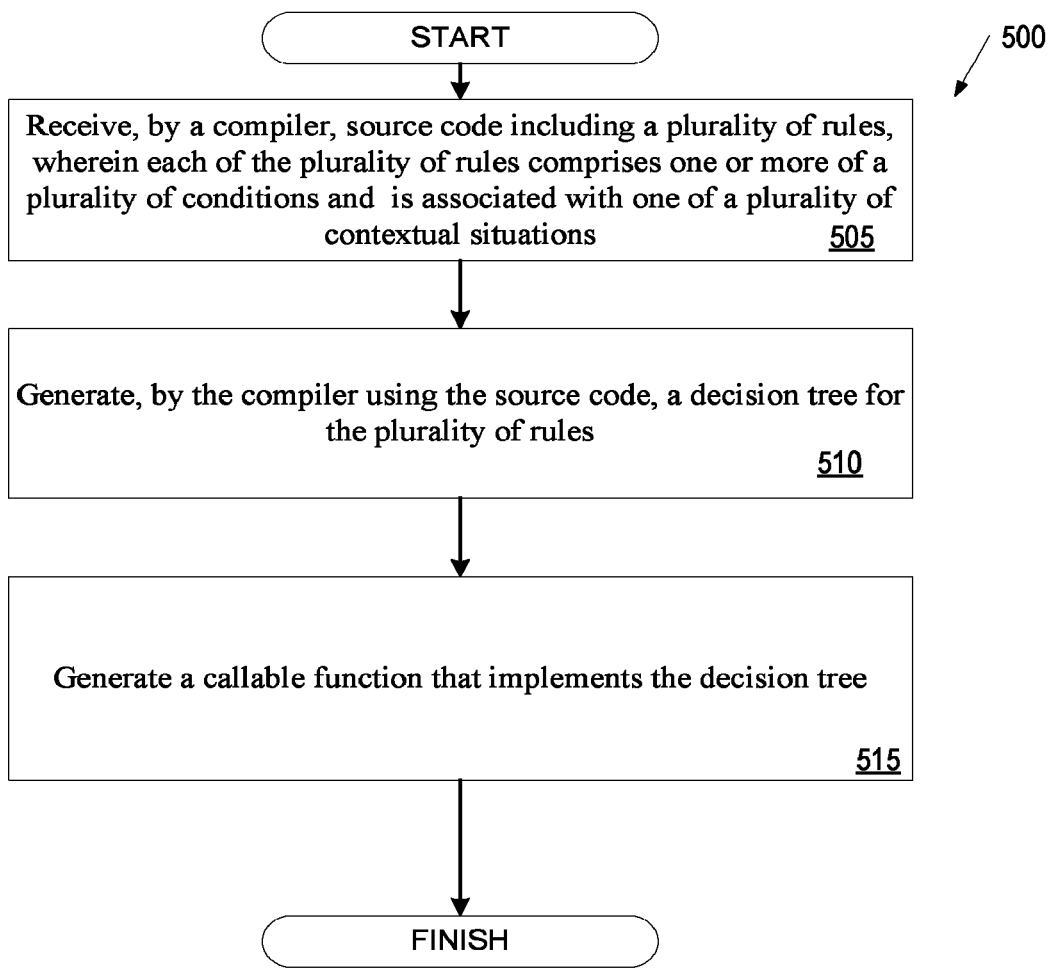
FIG. 5 is a flow diagram illustrating a method for generating a callable function that implements a decision tree, in accordance with some implementations.

FIG. 5 is a flow diagram illustrating method 500 for generating a callable function that implements a decision tree, for example a decision tree as in FIG. 4A, in accordance with some implementations. Method 500 may be performed by processing logic that includes hardware (e.g., circuitry, dedicated logic, programmable logic, microcode), software (e.g., instructions run on a processing device to perform hardware simulation), or a combination thereof. In one implementation, contextual music application 140, and in particular, contextual music compiler 112, may perform some or all the operations described herein.

Method 500 begins at block 505 where processing logic receives source code defining multiple rules. Each of the multiple of rules includes one or more of multiple conditions and is associated with one of multiple contextual situations. At block 510, processing logic generates, using the source code, a decision tree for the multiple rules. Generating the decision tree includes minimizing a number of the multiple conditions to be evaluated to determine whether a particular rule of the multiple rules has been satisfied. At block 515, processing logic generates a callable function that implements the decision tree. The callable function identifies one of the multiple contextual situations that corresponds to a state of an application interacted with by a user.

Once the callable function has been generated, a processing device may use the callable function in controlling a device (such as an autonomous vehicle) or process. The processing device that uses the callable function in controlling the device or process may have generated the callable function, but this implementation does not require this. The processing device may use the callable function to control the device or process by identifying, using the callable function, a contextual situation; and controlling the device or process based on the identified contextual situation. In an implementation, the processing device may determine at least one action to be performed by the device or process based at least on the identified contextual situation and optionally also based on one or more further inputs. The processing device may be further controlling or instructing the device or process to implement a first action of the at least one determined actions.

Figure 6:
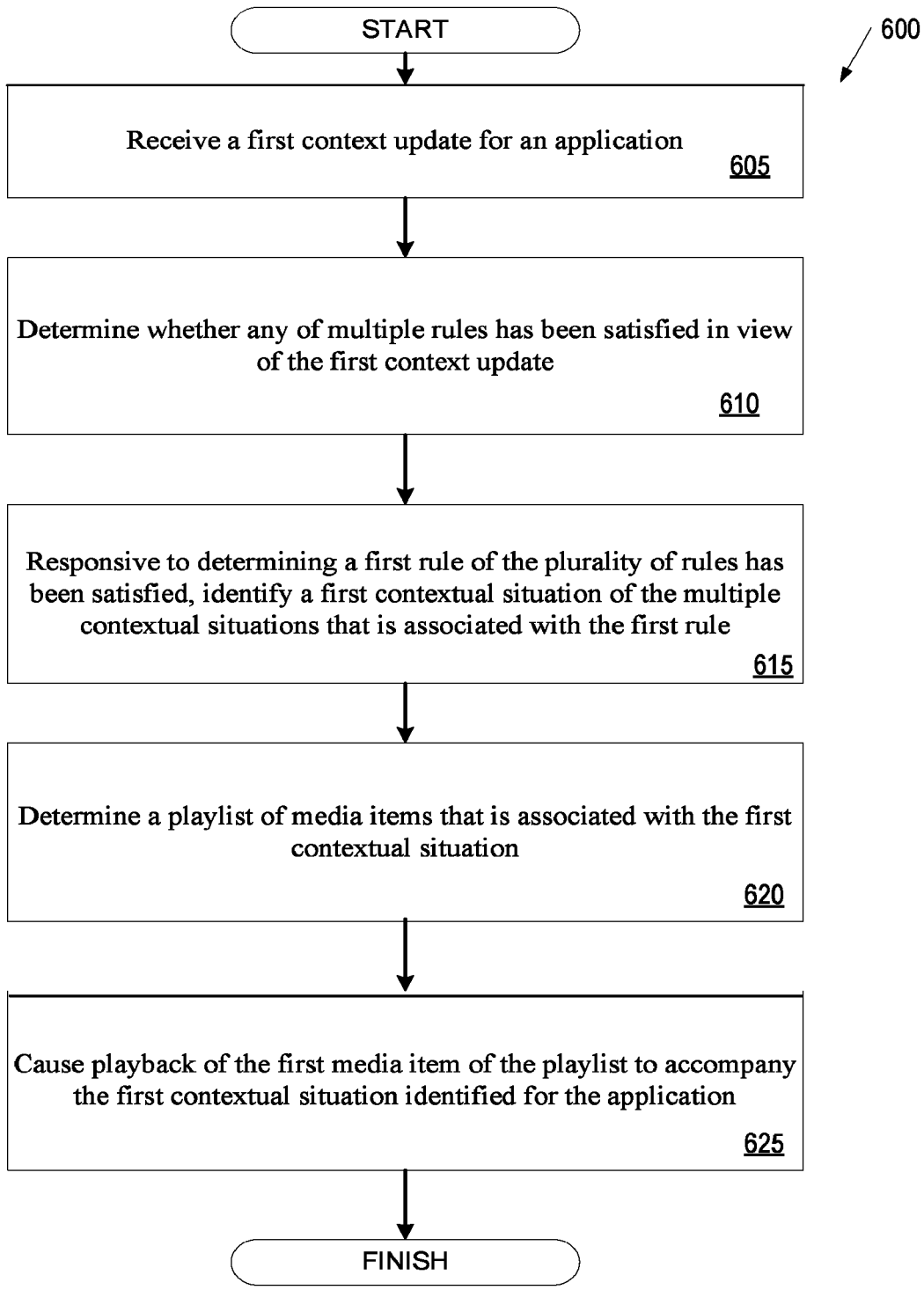
FIG. 6 is a flow diagram illustrating a method for providing a playlist for a current contextual situation associated with an application interacted with by a use, in accordance with some implementations.

FIG. 6 is a flow diagram illustrating a method for providing a playlist for a current contextual situation associated with an application interacted with by a user in accordance with some implementations. Method 600 may be performed by processing logic that includes hardware (e.g., circuitry, dedicated logic, programmable logic, microcode), software (e.g., instructions run on a processing device to perform hardware simulation), or a combination thereof. In one implementation, contextual music application 140, in particular contextual music selector 113, may perform some or all the operations described herein.

Method 600 begins at block 605 where processing logic receives a first context update for an application. At block 610, processing logic determines whether one or more of multiple rules have been satisfied in view of the first context update. The multiple rules include multiple conditions and are associated with multiple contextual situations. The determining includes minimizing a number of the multiple conditions to be evaluated to determine whether a particular rule of the multiple rules has been satisfied. At block 615, processing logic responsive to determining a first rule of the multiple rules has been satisfied, identifies a first contextual situation of the multiple contextual situations that is associated with the first rule. At block 620, processing logic determines a playlist of media items that is associated with the first contextual situation. At block 625, processing logic causes playback of a first media item of the playlist of media items to accompany the first contextual situation identified for the application.

Figure 7:
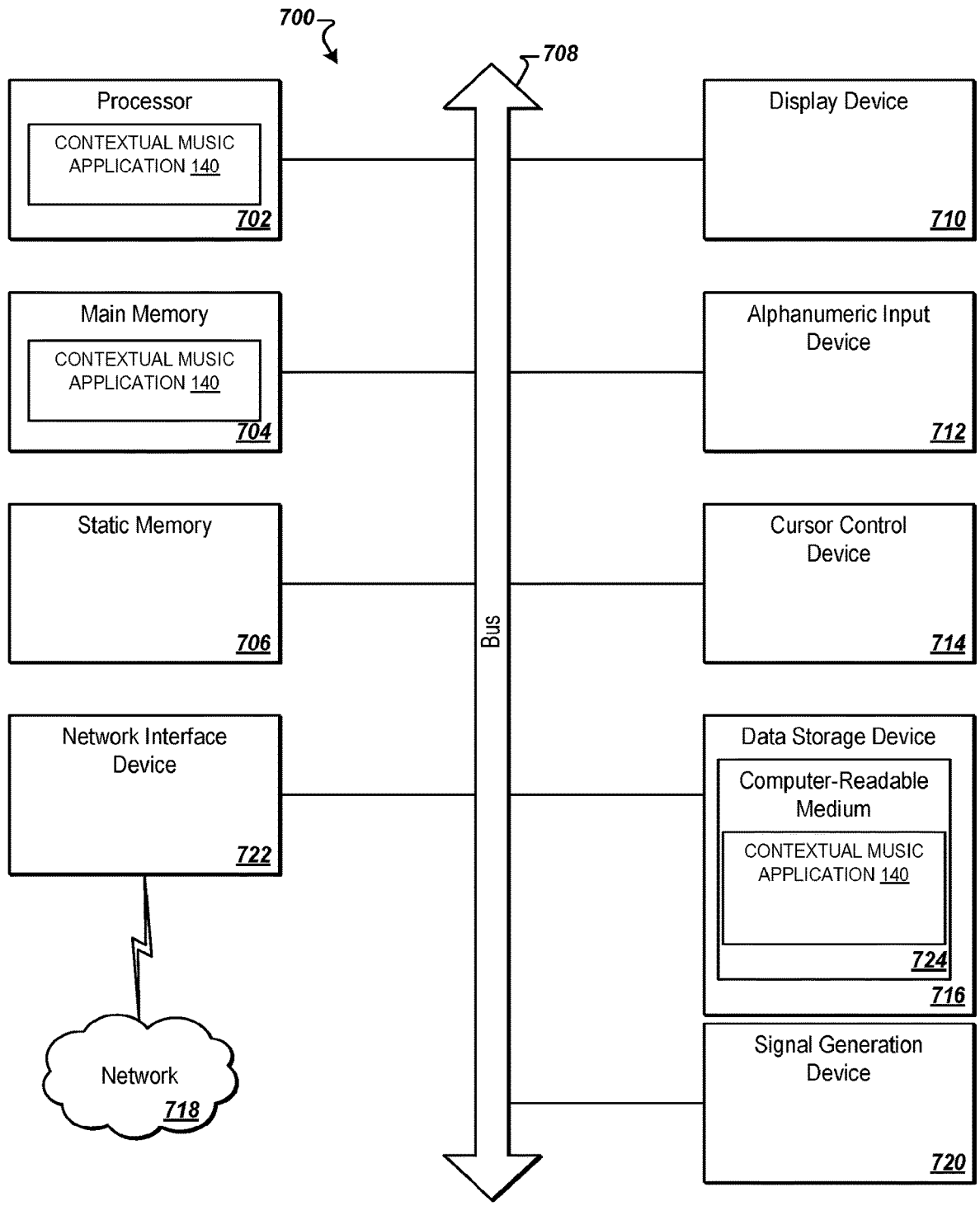
FIG. 7 is a block diagram illustrating an exemplary computer system, according to some implementations.

FIG. 7 is a block diagram illustrating an exemplary computer system 700, in accordance with implementations. The computer system 700 executes one or more sets of instructions that cause the machine to perform one or more of the methodologies discussed herein. Set of instructions, instructions, and the like may refer to instructions that, when executed by computer system 700, cause computer system 700 to perform one or more operations of contextual music application 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or a machine capable of executing a set of instructions (sequential or otherwise) that specify actions to be taken by that machine. Further, while only a single machine is illustrated, the term "machine" shall also be taken to include a collection of machines that individually or jointly execute the sets of instructions to perform one or more of the methodologies discussed herein.

The computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions of the system architecture 100 and the contextual music application 140 for performing the operations discussed herein.

The computer system 700 may further include a network interface device 722 that provides communication with other machines over a network 718, such as a local area network (LAN), an intranet, an extranet, or the Internet. The computer system 700 also may include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a non-transitory computer-readable storage medium 724 on which is stored the sets of instructions of the system architecture 100 and contextual music application 140 embodying one or more of the methodologies or functions described herein. The sets of instructions of the system architecture 100 and contextual music application 140 may also reside, completely or at least partially, within the main memory 704 and/or within the processing device 702 during execution thereof by the computer system 700, the main memory 704 and the processing device 702 also constituting computer-readable storage media. The sets of instructions may further be transmitted or received over the network 718 via the network interface device 722.

While the example of the computer-readable storage medium 724 is shown as a single medium, the term "computer-readable storage medium" can include a single medium or multiple media (e.g., a centralized or distributed database, and/or associated caches and servers) that store the sets of instructions. The term "computer-readable storage medium" can include a medium that is capable of storing, encoding or carrying a set of instructions for execution by the machine and that cause the machine to perform one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "receiving", "generating", "determining", "organizing", "evaluating", "retrieving", "applying", "identifying", "keeping", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, a type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or a type of media suitable for storing electronic instructions.

The words "example" or "exemplary" are used herein to mean serving as an example, instance, or illustration. An aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean the natural inclusive permutations. That is, if X includes A; X includes B; or X includes both A and B, then "X includes A or B" is satisfied under one or more of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
   receiving, by a processing device, a first context update identifying a present state associated with an application;
   identifying a first contextual situation, among a plurality of contextual situations associated with a plurality of conditions, that corresponds to the first context update, wherein identifying the first contextual situation comprises:
   implementing a decision tree to minimize a number of the plurality of conditions to be evaluated,
   comparing parameters of a plurality of features associated with the first context update with conditions of the plurality of conditions that are associated with the decision tree, and
   identifying the first contextual situation based on a satisfaction of one or more of the plurality of conditions corresponding to the decision tree; and
   determining one or more actions to be performed corresponding with the first contextual situation.

2. The method of claim 1, wherein the application is part of an online gaming system.

3. The method of claim 1, wherein the application is part of an autonomous vehicle system.

4. The method of claim 1, further comprising:
   causing playback of a first media item of a playlist of media items to accompany the first contextual situation identified for the application.

5. The method of claim 1, further comprising:
   receiving a second context update indicative of a new state associated with the application;
   identifying a second contextual situation, among the plurality of contextual situations associated with the plurality of conditions, that corresponds to the second context update; and determining one or more other actions to be performed with the second contextual situation.

6. The method of claim 5, further comprising:
causing playback of a second media item of a playlist of media items to accompany the second contextual situation identified for the application.

7. The method of claim 1, wherein identifying the first contextual situation, among the plurality of contextual situations associated with the plurality of conditions, that corresponds to the first context update comprises:
applying a data set associated with the first context update to a callable function that implements the decision tree, wherein the plurality of conditions are associated with a plurality of nodes of the decision tree.

8. The method of claim 7, wherein identifying the first contextual situation, among the plurality of contextual situations associated with the plurality of conditions, that corresponds to the first context update further comprises:
keeping a record of conditions of the plurality of conditions that have outcomes that are explicitly and implicitly determined from evaluated nodes of the plurality of nodes of the decision tree.

9. The method of claim 7, wherein identifying the first contextual situation, among the plurality of contextual situations associated with the plurality of conditions, that corresponds to the first context update further comprises:
determining an initial condition of the plurality of conditions to evaluate by determining a root node of the plurality of nodes of the decision tree, wherein the root node indicates a feature and a condition associated with the feature; and
evaluating the initial condition identified by the root node in view of the data set of the first context update.

10. The method of claim 9, wherein identifying the first contextual situation, among the plurality of contextual situations associated with the plurality of conditions, that corresponds to the first context update further comprises:
responsive to the evaluation of the initial condition, evaluating a subsequent node of the decision tree where a number of the plurality of conditions that have outcomes that are implied by the evaluation of the initial condition are eliminated from subsequent evaluation.

11. A system, comprising:
a memory; and
processing device, coupled to the memory, to perform operations comprising:
receiving a first context update identifying a present state associated with an application;
identifying a first contextual situation, among a plurality of contextual situations associated with a plurality of conditions, that corresponds to the first context update, wherein identifying the first contextual situation comprises:
implementing a decision tree to minimize a number of the plurality of conditions to be evaluated,
comparing parameters of a plurality of features associated with the first context update with conditions of the plurality of conditions that are associated with the decision tree, and
identifying the first contextual situation based on a satisfaction of one or more of the plurality of conditions corresponding to the decision tree; and
determining one or more actions to be performed corresponding with the first contextual situation.

12. The system of claim 11, the operations further comprising:
causing playback of a first media item of a playlist of media items to accompany the first contextual situation identified for the application.

13. The system of claim 11, the operations further comprising:
receiving a second context update indicative of a new state associated with the application;
identifying a second contextual situation, among the plurality of contextual situations associated with the plurality of conditions, that corresponds to the second context update; and
determining one or more other actions to be performed with the second contextual situation.

14. The system of claim 13, the operations further comprising:
causing playback of a second media item of a playlist of media items to accompany the second contextual situation identified for the application.

15. The system of claim 11, wherein identifying the first contextual situation, among the plurality of contextual situations associated with the plurality of conditions, that corresponds to the first context update comprises:
applying a data set associated with the first context update to a callable function that implements the decision tree, wherein the plurality of conditions are associated with a plurality of nodes of the decision tree.

16. The system of claim 15, wherein identifying the first contextual situation, among the plurality of contextual situations associated with the plurality of conditions, that corresponds to the first context update further comprises:
keeping a record of conditions of the plurality of conditions that have outcomes that are explicitly and implicitly determined from evaluated nodes of the plurality of nodes of the decision tree.

17. The system of claim 15, wherein identifying the first contextual situation, among the plurality of contextual situations associated with the plurality of conditions, that corresponds to the first context update further comprises:
determining an initial condition of the plurality of conditions to evaluate by determining a root node of the plurality of nodes of the decision tree, wherein the root node indicates a feature and a condition associated with the feature; and
evaluating the initial condition identified by the root node in view of the data set of the first context update.

18. The system of claim 17, wherein identifying the first contextual situation, among the plurality of contextual situations associated with the plurality of conditions, that corresponds to the first context update further comprises:
responsive to the evaluation of the initial condition, evaluating a subsequent node of the decision tree where a number of the plurality of conditions that have outcomes that are implied by the evaluation of the initial condition are eliminated from subsequent evaluation.

19. A non-transitory computer-readable medium comprising instructions that, responsive to execution by a processing device, cause the processing device to perform operations comprising:
receiving a first context update identifying a present state associated with an application;
identifying a first contextual situation, among a plurality of contextual situations associated with a plurality of conditions, that corresponds to the first context update, wherein identifying the first contextual situation comprises:

implementing a decision tree to minimize a number of the plurality of conditions to be evaluated, comparing parameters of a plurality of features associated with the first context update with conditions of the plurality of conditions that are associated with the decision tree, and identifying the first contextual situation based on a satisfaction of one or more of the plurality of conditions corresponding to the decision tree; and determining one or more actions to be performed corresponding with the first contextual situation.

20. The non-transitory computer-readable medium of claim 19, the operations further comprising:

causing playback of a first media item of a playlist of media items to accompany the first contextual situation identified for the application.

\* \* \* \* \*